US010152555B2

(12) United States Patent
Ryu et al.

(10) Patent No.: US 10,152,555 B2
(45) Date of Patent: Dec. 11, 2018

(54) METHOD AND APPARATUS FOR COMPOSING MARKUP FOR ARRANGING MULTIMEDIA ELEMENTS

(71) Applicant: Samsung Electronics Co. Ltd., Suwon-si, Gyeonggi-do (KR)

(72) Inventors: Young-Sun Ryu, Seongnam-si (KR); Jae-Yeon Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 340 days.

(21) Appl. No.: 13/940,988

(22) Filed: Jul. 12, 2013

(65) Prior Publication Data

US 2014/0019408 A1 Jan. 16, 2014

(30) Foreign Application Priority Data

Jul. 12, 2012 (KR) .................. 10-2012-0076304
Mar. 25, 2013 (KR) .................. 10-2013-0031673

(51) Int. Cl.
*G06F 17/22* (2006.01)
*G06F 17/30* (2006.01)
(Continued)

(52) U.S. Cl.
CPC ...... *G06F 17/30908* (2013.01); *G06F 17/211* (2013.01); *G06F 17/2247* (2013.01);
(Continued)

(58) Field of Classification Search
CPC ............ H04N 21/431; H04N 21/44012; G06F 17/30908
See application file for complete search history.

(56) References Cited

U.S. PATENT DOCUMENTS 5,515,490 A * 5/1996 Buchanan ......... G06F 17/30017
375/E7.006
6,038,573 A 3/2000 Parks
(Continued)

FOREIGN PATENT DOCUMENTS

CN 1311580 A 9/2001
CN 101111898 A 1/2008
(Continued)

OTHER PUBLICATIONS

Hiroaki Harada, Data model for multimedia scenario description, Information Processing Society No. 39 (Late 1989) Conference Papers (II); Oct. 18, 1989.
(Continued)

*Primary Examiner* — Maikhanh Nguyen
(74) *Attorney, Agent, or Firm* — Jefferson IP Law, LLP (57) ABSTRACT

A method of configuring a markup for composition of multimedia elements in a multimedia communication system is provided. The method includes configuring area description information corresponding to each of a plurality of areas included in a scene, configuring multimedia description information corresponding to at least one multimedia included in each of the plurality of areas, configuring scene composition information describing spatial composition and temporal composition of each of the plurality of areas, and configuring a markup including the scene composition information, the area description information, and the multimedia description information.

21 Claims, 10 Drawing Sheets

(51) Int. Cl.
| | | |
|---|---|---|
| *H04N 7/14* | (2006.01) | |
| *H04N 21/234* | (2011.01) | |
| *H04N 21/431* | (2011.01) | |
| *H04N 21/44* | (2011.01) | |
| *H04N 21/854* | (2011.01) | |
| *H04N 21/8543* | (2011.01) | |
| *G06F 17/21* | (2006.01) | |

(52) U.S. Cl.
CPC ....... *G06F 17/30017* (2013.01); *H04N 7/147* (2013.01); *H04N 21/23412* (2013.01); *H04N 21/431* (2013.01); *H04N 21/44012* (2013.01); *H04N 21/854* (2013.01); *H04N 21/8543* (2013.01)

(56) References Cited

U.S. PATENT DOCUMENTS

| | | | | |
|---|---|---|---|---|
| 6,411,724 | B1* | 6/2002 | Vaithilingam | G06F 17/30038 382/100 |
| 6,596,031 | B1 | 7/2003 | Parks | |
| 6,621,939 | B1* | 9/2003 | Negishi | G06T 17/00 382/243 |
| 6,961,954 | B1* | 11/2005 | Maybury | G06F 17/30787 707/999.003 |
| 7,039,875 | B2* | 5/2006 | Khalfay | G06F 8/30 715/744 |
| 7,254,825 | B1 | 8/2007 | Sharples et al. | |
| 7,725,812 | B1 | 5/2010 | Balkus et al. | |
| 7,808,900 | B2* | 10/2010 | Suh | H04N 21/6582 370/230.1 |
| 7,831,579 | B2* | 11/2010 | Wade | G06F 17/30864 707/705 |
| 8,090,719 | B2* | 1/2012 | Wade | G06F 17/30864 707/706 |
| 8,559,792 | B2* | 10/2013 | Chung | G06F 17/30256 386/278 |
| 8,707,151 | B2* | 4/2014 | Hwang | H04N 7/24 345/473 |
| 2001/0018769 | A1 | 8/2001 | Matsui | |
| 2001/0056471 | A1* | 12/2001 | Negishi | H04N 5/4401 709/208 |
| 2002/0031188 | A1* | 3/2002 | Negishi | H04B 1/66 375/240.26 |
| 2004/0021684 | A1* | 2/2004 | B. Millner | H04N 21/234318 715/719 |
| 2004/0054653 | A1* | 3/2004 | Dufourd | H04N 21/63 |
| 2004/0268224 | A1* | 12/2004 | Balkus | G06F 17/30056 715/203 |
| 2005/0012743 | A1* | 1/2005 | Kapler | G06F 17/30064 345/419 |
| 2005/0125428 | A1* | 6/2005 | Kang | G06F 17/30244 |
| 2005/0226196 | A1* | 10/2005 | Suh | H04N 21/6582 370/338 |
| 2006/0174310 | A1* | 8/2006 | Lee | H04H 60/65 725/135 |
| 2006/0233531 | A1 | 10/2006 | Toyama et al. | |
| 2007/0250773 | A1* | 10/2007 | Moon | G11B 27/034 715/716 |
| 2008/0028285 | A1 | 1/2008 | Hoche et al. | |
| 2008/0124045 | A1* | 5/2008 | Chung | G06F 17/30256 386/239 |
| 2008/0150964 | A1* | 6/2008 | Cho | G09G 5/14 345/629 |
| 2008/0240669 | A1* | 10/2008 | Oh | H04N 7/147 386/329 |
| 2008/0273863 | A1* | 11/2008 | Moon | G11B 27/034 386/248 |
| 2008/0301545 | A1* | 12/2008 | Zhang | G06F 17/212 715/235 |
| 2009/0003434 | A1* | 1/2009 | Song | H04N 19/25 375/240.01 |
| 2009/0113302 | A1* | 4/2009 | Cho | G11B 17/228 715/716 |
| 2009/0167769 | A1* | 7/2009 | Gouesbet | G06F 17/30905 345/473 |
| 2009/0265603 | A1* | 10/2009 | Hwang | H04N 7/24 715/201 |
| 2010/0002763 | A1* | 1/2010 | Joung | H04N 21/23412 375/240.01 |
| 2010/0070868 | A1* | 3/2010 | Humpleman | H04L 12/2803 715/736 |
| 2010/0095228 | A1* | 4/2010 | Hwang | G06F 9/4443 715/762 |
| 2010/0125808 | A1* | 5/2010 | Lim | G06F 3/048 715/800 |
| 2010/0325529 | A1 | 12/2010 | Sun | |
| 2011/0060979 | A1 | 3/2011 | O'Brien-Strain | |
| 2011/0145697 | A1* | 6/2011 | Cha | H04N 21/23412 715/234 |
| 2011/0167081 | A1 | 7/2011 | Kosaka et al. | |
| 2012/0159314 | A1 | 6/2012 | Schrier et al. | |

FOREIGN PATENT DOCUMENTS

| | | |
|---|---|---|
| EP | 1 126 714 A2 | 8/2001 |
| EP | 1 126 714 A3 | 12/2005 |
| JP | H 05-81406 | 4/1993 |
| JP | H 05-242143 | 9/1993 |
| JP | H 09-81361 | 3/1997 |
| JP | 2006-238147 A | 9/2006 |
| WO | 2006/090908 A1 | 8/2006 |

OTHER PUBLICATIONS

Hirotsu Tsuo, "Multimedia Description Language SMIL", bit, Dec. 1998 issue (vol. 30, No. 12); Dec. 1, 1998.

Bulterman, "SMIL 2.0 Part 2: Examples and Comparisons", IEEE Multimedia, vol. 9, No. 1, Aug. 7, 2002, p. 74-84, ISSN: 1070-986X.

Muriel Jourdan, Laurent Tardif, and Lionel Villard; "Authoring Smil documents by direct manipulations during presentation"; OPERA project; Jan. 1, 1999; pp. 1-12; 655 avenue de l'Europe, 38330 Montbonnot, France.

Dominique Hazel-Massieux; "Tabless layout HOWTO"; http://www.w3.org/2002/03/csslayout-howto; pp. 1-2; Jan. 3, 2012.

* cited by examiner

```
<xml>
<Cl>
// Scene composition information
<mmt-ci:composition>
    <area id="area1" ref="div1" left="0" top="0" width="800px" height="600px" begin=0s />
    <area id="area2" ref="div2" left="800" top="0" width="200px" height="150px" begin="0s"/>
    <area id="area3" ref="div3" left="0" top="600" width="200px" height="150px" dur="1000s"/>
</mmt-ci:composition>
<mmt-ci:MediaSync> // Media Sync information
    <Asset refid="video1" beginClip="40s" />
    // Video1 temporal information
    <Asset refid="image1" begin="40s" />
</mmt-ci:MediaSync>
</Cl>
</xml>
```

```
<html>
<head>
</head>
<body> // Scene description
    <div id="div1" width="800" height="600"> // Area1 description
        <video id="video1" src="video1.mpg" width="600px" height="400px" />
    </div>
    <div id="div2" width="400" height="600"> //Area2 description
        <img id="image1" src="image1.png" width="200px" height="150px" />
        <p> More information </p>
    </div>
    <div id="div3" width="1200" height="200"> // Area3 description
        <p> Weather forecast </p>
    </div>
</body>
</html>
```

METHOD AND APPARATUS FOR COMPOSING MARKUP FOR ARRANGING MULTIMEDIA ELEMENTS

CROSS-REFERENCE TO RELATED APPLICATION(S)

This application claims the benefit under 35 U.S.C. § 119(a) of a Korean patent application filed on Jul. 12, 2012 in the Korean Intellectual Property Office and assigned Serial No. 10-2012-0076304 and of a Korean patent application filed on Mar. 25, 2013 in the Korean Intellectual Property Office and assigned Serial No. 10-2013-0031673, the entire disclosure of each of which is hereby incorporated by reference.

TECHNICAL FIELD

The present disclosure relates to multimedia elements. More particularly, the present disclosure relates to a method of composing a markup for spatially and temporally arranging and synchronizing multimedia elements.

BACKGROUND

The demand for multimedia services has continuously increased, and the necessities of providing various multimedia services for current display devices and configuring a new markup for the provision of the various multimedia services have also increased.

A technology defining a multimedia element on the web largely includes a Hypertext Markup Language (HTML) and a Synchronized Multimedia Integration Language (SMIL). Hereinafter, the HTML and the SMIL will be described in more detail with reference to FIGS. 1 and 2.

Figure 1:
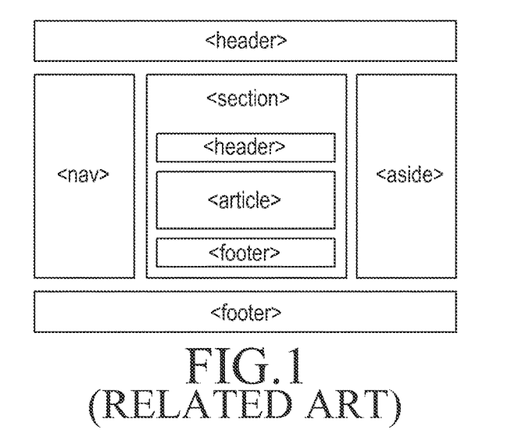
FIG. 1 illustrates a Hypertext Markup Language (HTML) document structure in a multimedia communication system according to the related art.

FIG. 1 illustrates an HTML document structure in a multimedia communication system according to the related art.

Referring to FIG. 1, the HTML is a markup language for defining a hypertext document structure, and corresponds to a technology most widely used on the web today, of which revision work of version 5 is currently being completed. HTML version 5 has enhanced support for multimedia services such as a video, audio and the like, but cannot support functions such as temporal composition or interaction of the media, synchronization, and the like since the HTML is basically a language for defining a structure of a static document.

As illustrated in FIG. 1, the HTML document structure includes <header>, <nav>, <section>, <article>, <footer>, and <aside>.

<header> indicates a logo area, <nav> indicates a menu area, <section> indicates contents of the body, <article> indicates a main content area within the body, <footer> indicates a lower part of a site, and <aside> indicates a sub area or an advertisement content area.

Figure 2:
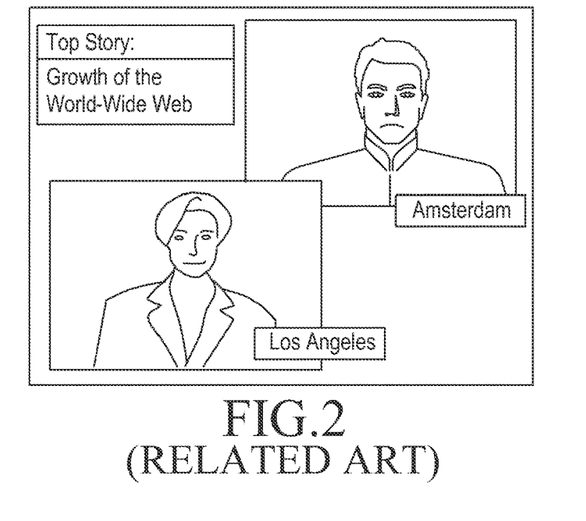
FIG. 2 illustrates an example of composing multimedia elements by using a Synchronized Multimedia Integration Language (SMIL) in a multimedia communication system according to the related art.

FIG. 2 illustrates an example of arranging multimedia elements by using the SMIL in a multimedia communication system according to the related art.

Referring to FIG. 2, the SMIL is the World Wide Web Consortium (W3C) standard established for temporally and spatially composing and controlling multimedia data such as videos, audio, images, text and the like on the web by using an eXtensible Markup Language (XML).

As illustrated in FIG. 2, there is an advantage of temporally and spatially composing and controlling the multimedia data through the use of the SMIL. However, since the SMIL is defined by the XML, the SMIL requires a separate player in order to render a document defined by the SMIL, and accordingly, corresponds to the standard which is not actually used in current industrial fields.

As described, although the multimedia elements are defined by the aforementioned HTML or SMIL, both the HTML and the SMIL can only compose the media and neither can configure the scene including a plurality of areas. Accordingly, there exists a need for an apparatus and method for dividing multimedia elements into scene, area, and media levels to configure a markup.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for dividing multimedia elements into scene, area, and media levels to configure a markup.

Another aspect of the present disclosure is to provide a method and an apparatus for temporally and/or spatially composing multimedia elements in a multimedia communication system and configuring a markup which can support synchronization between the multimedia.

In accordance with an aspect of the present disclosure, a method of configuring a markup for composition of multimedia elements in a multimedia communication system is provided. The method includes configuring a markup including scene composition information, area description information, and multimedia description information and spatially and temporally composing multimedia elements according to the configured markup.

In accordance with another aspect of the present disclosure, a display device for configuring a markup for composition of multimedia elements in a multimedia communication system is provided. The display device includes a markup configuration unit configured to configure area description information corresponding to each of a plurality of areas included in a scene, to configure multimedia description information corresponding to at least one multimedia included in each of the plurality of areas, to configure scene composition information describing spatial composition and temporal composition of each of the plurality of areas, and to configure a markup including the scene composition information, the area description information, and the multimedia description information, and a display unit configured to display the scene based on the markup.

The present disclosure can not only spatially and/or temporally compose multimedia elements but also provides a synchronization means between the multimedia. Further, a basic scene can be configured in a browser which cannot support an extensible markup. In addition, the present disclosure provides a means which can variously configure and use scene information in a plurality of devices in the future by separating scene description information and actual area description and media expression information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 3:
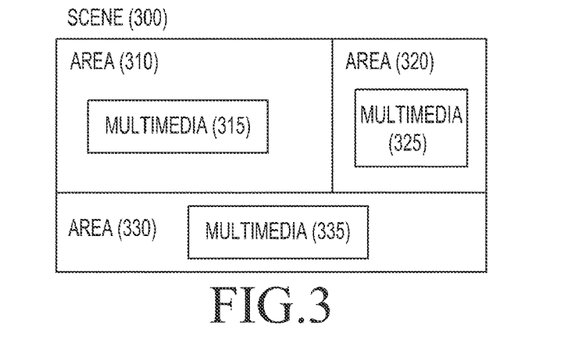
FIG. 3 illustrates an example of configuring a scene for a display device in a multimedia communication system according to an embodiment of the present disclosure.

FIG. 3 illustrates an example of configuring a scene for a display device in a multimedia communication system according to an embodiment of the present disclosure.

Referring to FIG. 3, a shown scene 300 is the uppermost end within the structure of a document, and there may be multiple scenes 300 within the document. For example, when it is assumed that a broadcast program for one hour consists of scenes, the broadcast program may be configured by scene #1 included the first 30 minutes and scene #2 included in the second 30 minutes.

One scene 300 is divided into a plurality of areas. The number of areas may be one to n based on one scene. Further, the area may be considered as an independent unit, and a current independent broadcast program, a Video on Demand (VoD) service, or a document of a web service may be considered as one area. That is, independent areas 310, 320, and 330 are gathered to form one scene 300.

One area consists of a plurality of multimedia. The multimedia may include all media data such as videos, audio, images, text and the like. That is, the areas 310, 320, and 330 include multimedia 315, 325, and 335, respectively.

Hereinafter, a method of configuring a markup for the scene 300 illustrated in FIG. 3 will be described with reference to FIGS. 4A and 4B according to embodiments of the present disclosure.

Figure 4A:
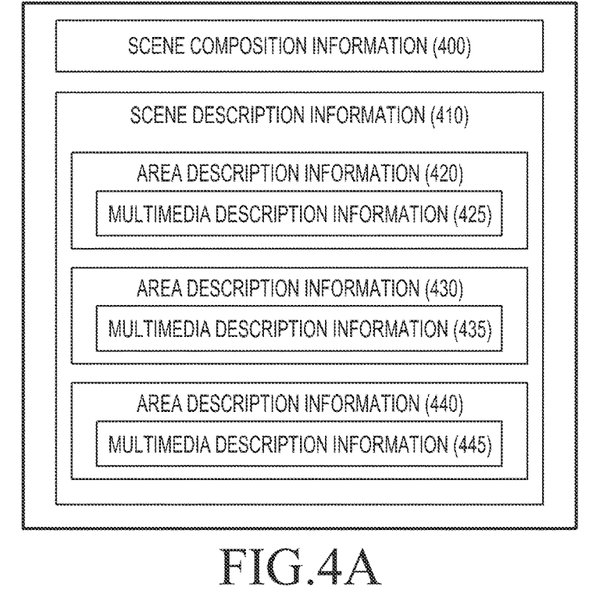
FIG. 4A illustrates an example of configuring a markup in a multimedia communication system according to a first embodiment of the present disclosure.

FIG. 4A illustrates an example of configuring a markup in a multimedia communication system according to a first embodiment of the present disclosure.

Referring to FIG. 4A, a shown markup document includes scene composition information 400, scene description information 410, and areas included in the scene 300. Moreover, multimedia information corresponds to information on the markup document in a one to one relationship. That is, each element of the area 310 and the multimedia 315 is expressed by area description information 420 and multimedia description information 425, each element of the area 320 and the multimedia 325 is expressed by area description information 430 and multimedia description information 435, and each element of the area 330 and the multimedia 335 is expressed by area description information 440 and multimedia description information 445.

The scene composition information 400 describes space composition and time composition of each of the areas included in the scene. Actual information on each area separately exists so that the areas can operate individually. Further, a plurality of scenes can be configured in one document by separately describing the space composition and the time composition of the scene.

Although one scene composition information 400 is illustrated in FIG. 4A, the number of scene composition information 400 may be plural to express a plurality of scenes including scene #1, scene #2, etc. Further, although the scene composition information 400 is described together with the time information and the space information in FIG. 4A, the time information and the space information can be separately described. Hereinafter, an example of separately describing the time information and the space information will be described with reference to FIG. 4B according to an embodiment of the present disclosure.

Figure 4B:
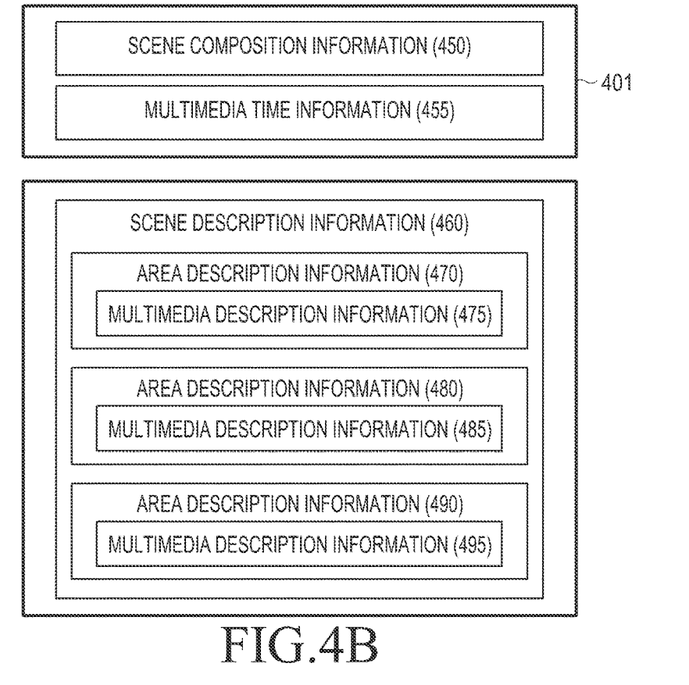
FIG. 4B illustrates an example of configuring a markup in a multimedia communication system according to a second embodiment of the present disclosure.

FIG. 4B illustrates an example of configuring a markup in a multimedia communication system according to a second embodiment of the present disclosure.

Referring to FIG. 4B, a separate markup document 401 including scene composition information 450 and multimedia time information 455 describing time information of each multimedia included in the scene is configured, and scene description information 460 including basic area description information 470, 480, and 490 and multimedia description information 475, 485, and 495 are described as one markup document. In this case, a browser reads the markup document indicating the scene description information 460 and the separate markup document 401 indicating the scene composition information 450 and the multimedia time information 455 together to configure a final scene. As described above, when the scene composition information 450 and the multimedia time information 455 are configured as the separate markup document, a browser which cannot support the method provided by the present disclosure also can display the scene description information 460.

Figure 5A:
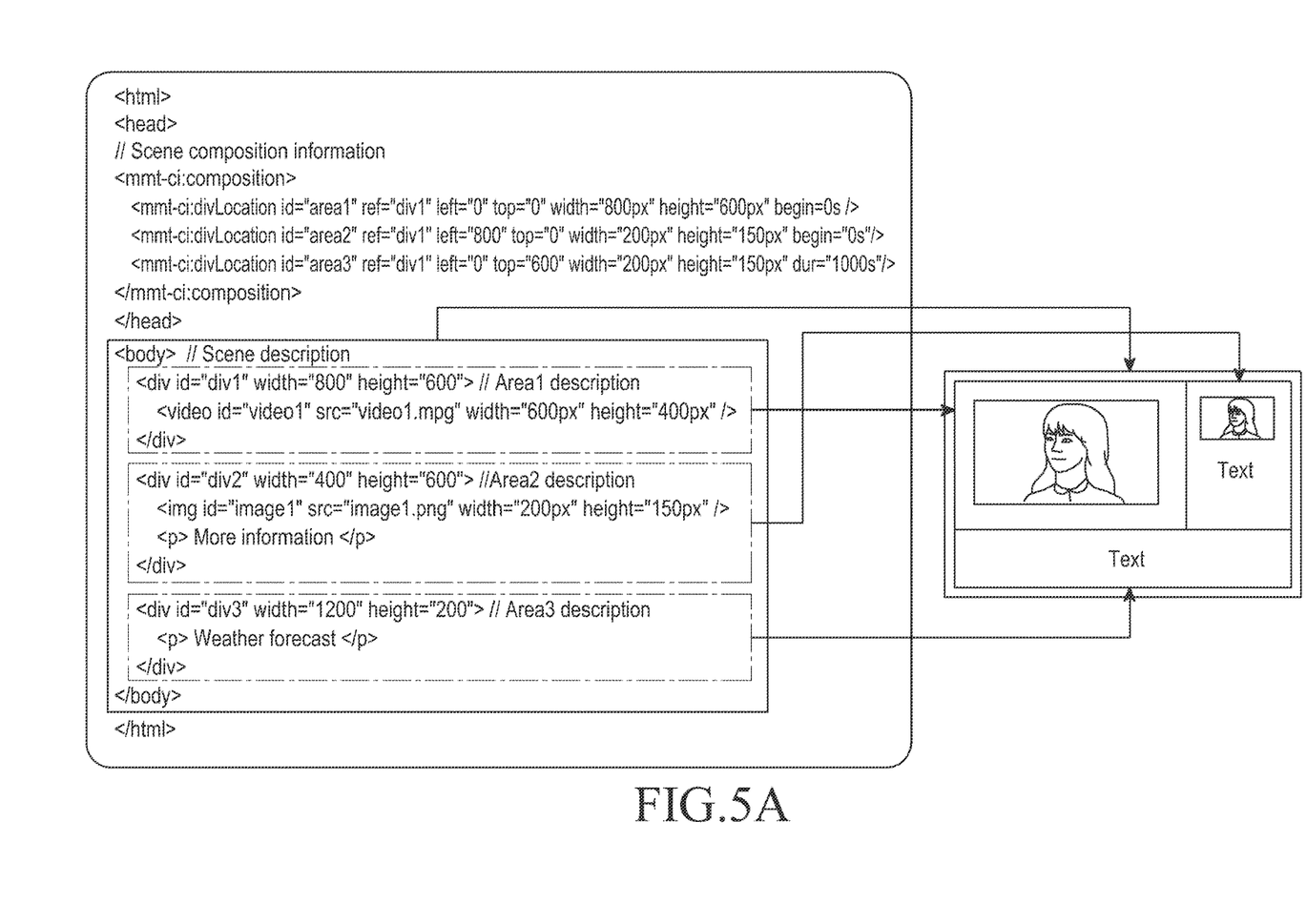
FIG. 5A illustrates the markup configured in the multimedia communication system and an example of a scene executed based on the markup according to the first embodiment of the present disclosure.

FIG. 5A illustrates the markup configured in the multimedia communication system and an example of a scene executed based on the markup according to the first embodiment of the present disclosure. That is, FIG. 5A illustrates an example of a scene executed based on the markup configured according to the method of FIG. 4A.

Referring to FIG. 5A, the shown markup document includes scene composition information, scene description information, area description information, multimedia description information, and description information for supporting a legacy browser.

(1) Scene Composition Information

The scene composition information includes a <mmt-ci:composition> element and a <mmt-ci:divLocation> element. The <mmt-ci:composition> element describes the scene composition information and includes the <mmt-ci:divLocation> element as a lower element, and the <mmt-ci:divLocation> element describes composition information of each area and has an attribute as shown in Table 1 below.

TABLE 1

| | |
|---|---|
| Id | unique identifier that distinguishes between elements |
| Ref | designates a reference for a connection with an actual area |
| Left | x axis offset |

TABLE 1-continued

| | |
|---|---|
| Top | y axis offset |
| width | width of an area |
| height | heightheight of an area |
| begin | describes start time of an area (in the unit of seconds) |
| beginAfter | starts after a particular element ends and designates an id value of an element |
| beginEvent | starts when a particular event is generated (for example, designates the same event as that when particular media is clicked) |
| dur | continues for a designated time (in units of seconds) |
| end | describes an end time of an area (in units of seconds) |
| endAfter | ends after a particular element ends and designates an id value of an element |
| endEvent | ends when a particular event is generated (for example, designates the same event as that when particular media is clicked) |
| repeat | designates whether to repeat, a boolean value |

(2) Scene Description Information

The scene description information includes a <body> element, does not have contents newly added for the scene description, and uses the <body> element of the Hypertext Markup Language (HTML) as an uppermost unit of the scene description.

(3) Area Description Information

The area description information includes <div> and <section> elements and directly uses the <div> and <section> elements of the HTML in the area description information. However, a new attribute as shown in Table 2 below may be additionally defined.

TABLE 2

| | |
|---|---|
| Width | designates an actual horizontal size of Division (div) |
| Height | designates an actual vertical size of div |
| background | designates a background color of div |
| Border | designates a border color of div |
| Begin | describes a start time of div (in units of seconds) |
| beginAfter | starts after a particular element ends and designates an id value of an element |
| beginEvent | starts when a particular event is generated (for example, designates the same event as that when particular media is clicked) |
| Dur | continues for a designated time (in units of seconds) |
| End | describes an end time of div (in units of seconds) |
| endAfter | ends after a particular element ends and designates an id value of an element |
| endEvent | ends when a particular event is generated (for example, designates the same event as that when particular media is clicked) |

(4) Multimedia Description Information

The multimedia description information has no contents newly added for the multimedia description and directly uses <video>, <audio>, <source>, <canvas>, <svg>, and <track> elements of the HTML in the media description information. Of course, if there are other multimedia defined by other standards, the multimedia can be directly used.

(5) Description Information for Supporting a Legacy Browser

The aforementioned scene composition information, scene description information, area description information, and multimedia description information are only effective to a browser that completely analyzes and supports a new markup. The area description and time description information of the scene cannot be completely supported by the HTML browser, but a minimum of the scene description information may be configured to be supported by the HTML browser.

Attributes to be supported by the HTML browser are described in Table 3 and Table 4 below. That is, Table 3 describes attributes supported by the <body> element, and Table 4 describes attributes supported by the <div> and <section> elements.

TABLE 3

| style | position | absolute position, a relative position |
|---|---|---|
| | width | horizontal size of an element |
| | height | vertical size of an element |
| | background | background color of an element |

TABLE 4

| style | position | absolute position, a relative position |
|---|---|---|
| | left | x axis offset of an element |
| | right | y axis offset of an element |
| | width | horizontal size of an element |
| | height | vertical size of an element |
| | background | background color of an element |
| | border | border of an element |

That is, in the shown scene description information of the markup, the <body> element includes three areas, so that three areas can be arranged in one scene.

Figure 5B:
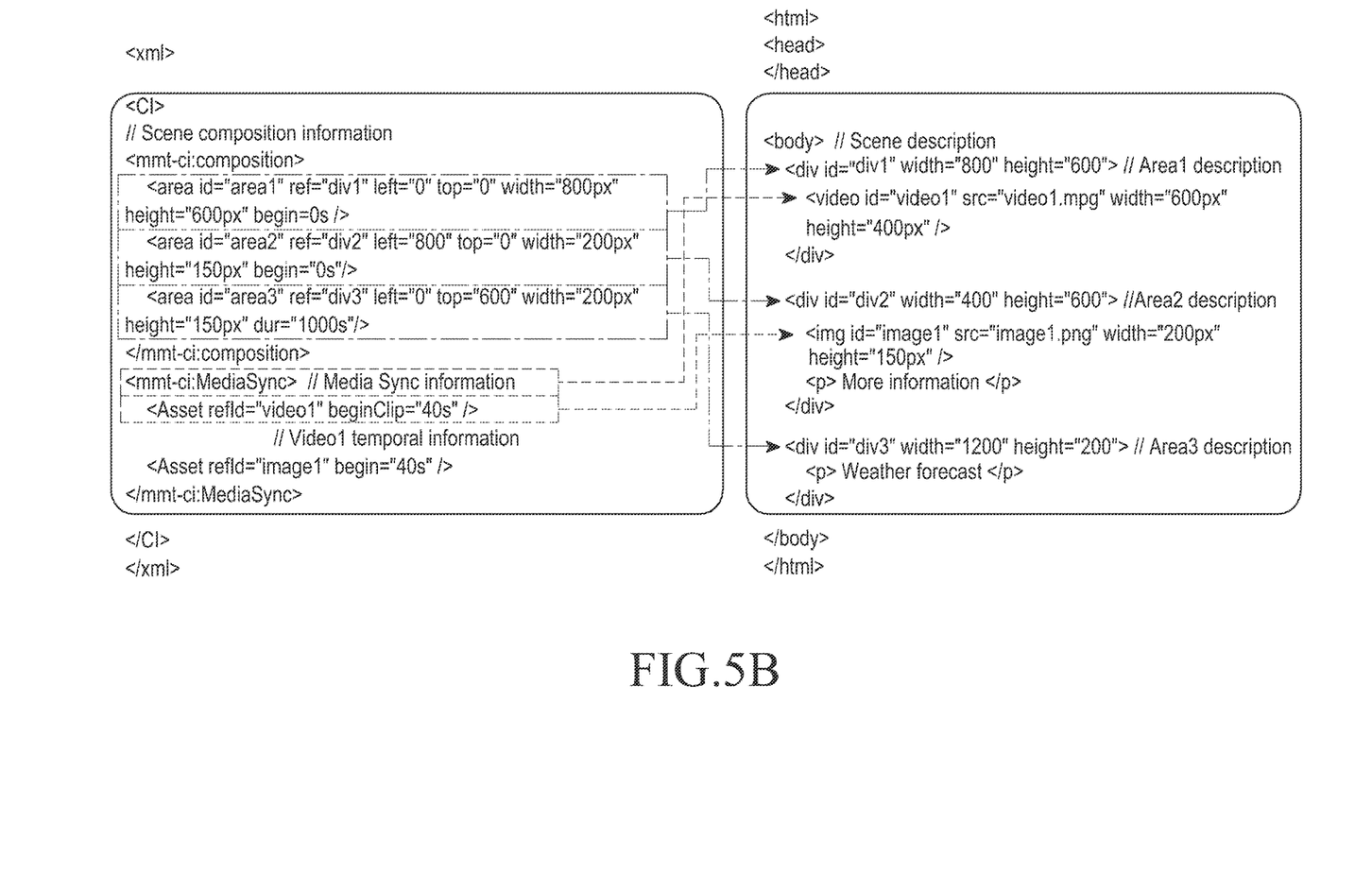
FIG. 5B illustrates an example of a scene executed based on the markup configured in the multimedia communication system according to the second embodiment of the present disclosure.

FIG. 5B illustrates an example of a scene executed based on the markup configured in the multimedia communication system according to the second embodiment of the present disclosure. That is, FIG. 5B illustrates an example of a markup configured according to the method of FIG. 4B.

Referring to FIG. 5B, the shown markup document includes scene composition information, scene description information, area description information, multimedia description information, and description information for supporting a legacy browser like the markup of FIG. 5A, and further includes multimedia time information.

(6) Multimedia Time Information

The multimedia time information includes a <mmt-ci:MediaSync> element and an <Asset> element. The <mmt-ci:MediaSync> element is an uppermost element for configuring the multimedia time information and includes the <Asset> element as a lower element. The <Asset> element corresponds to the multimedia one to one and indicates each of the multimedia time information included in the multimedia description information. Attributes supported by the <Asset> element are described through Table 5 below.

TABLE 5

| Begin | describes a start time of media (in units of seconds) |
|---|---|
| BeginClip | describes a position at which a reproduction of media starts (in units of seconds) |
| beginAfter | starts after a particular element ends and designates an id value of an element |
| beginEvent | starts when a particular event is generated (for example, designates the same event as that when particular media is clicked) |
| Dur | describes a duration time of media (in units of seconds) |
| End | describes an end time of media (in units of seconds) |
| EndClip | describes a position where a reproduction of media ends (in units of seconds) |
| endAfter | ends after a particular element ends and designates an id value of an element |
| endEvent | ends when a particular event is generated (for example, designates the same event as that when particular media is clicked) |

Figure 6A:
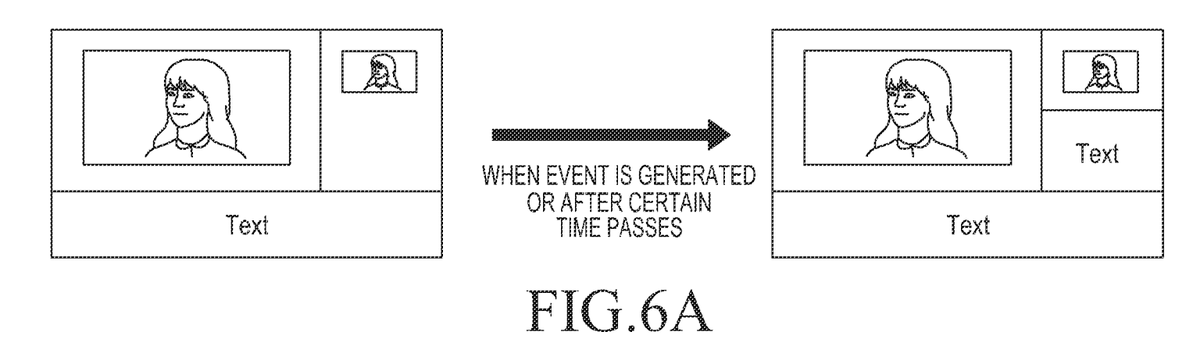
FIG. 6A illustrates an example of a scene configured in a browser supporting a markup configured in a multimedia communication system according to an embodiment of the present disclosure.

FIG. 6A illustrates an example of a scene configured in a browser supporting a markup configured in a multimedia communication system according to an embodiment of the present disclosure.

Referring to FIG. 6A, when the markup configured according to the embodiment of the present disclosure is used, a browser supporting a new element and attribute can show all functions related to scene switching and temporal and spatial composition. Further, a browser supporting the markup configured according to the embodiment of the present disclosure, that is, an extensible markup, can change space description when an event related to provision of a space description of the multimedia element is generated or after a certain time passes.

Figure 6B:
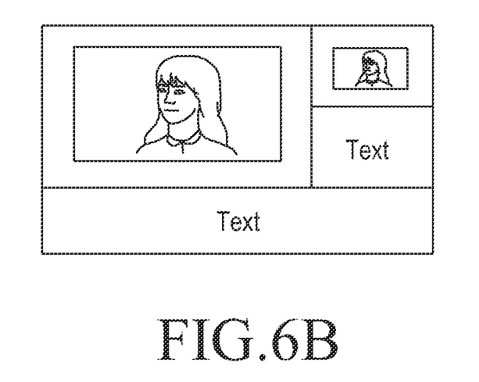
FIG. 6B illustrates an example of a scene configured in a browser supporting only HTML in a multimedia communication system according to an embodiment of the present disclosure.

FIG. 6B illustrates an example of a scene configured in a browser supporting only HTML in a multimedia communication system according to an embodiment of the present disclosure.

Referring to FIG. 6B, the browser supporting only the HTML can show only a minimum amount of the scene description information. That is, a browser which cannot support the extensible markup can provide only the scene description information.

Figure 7:
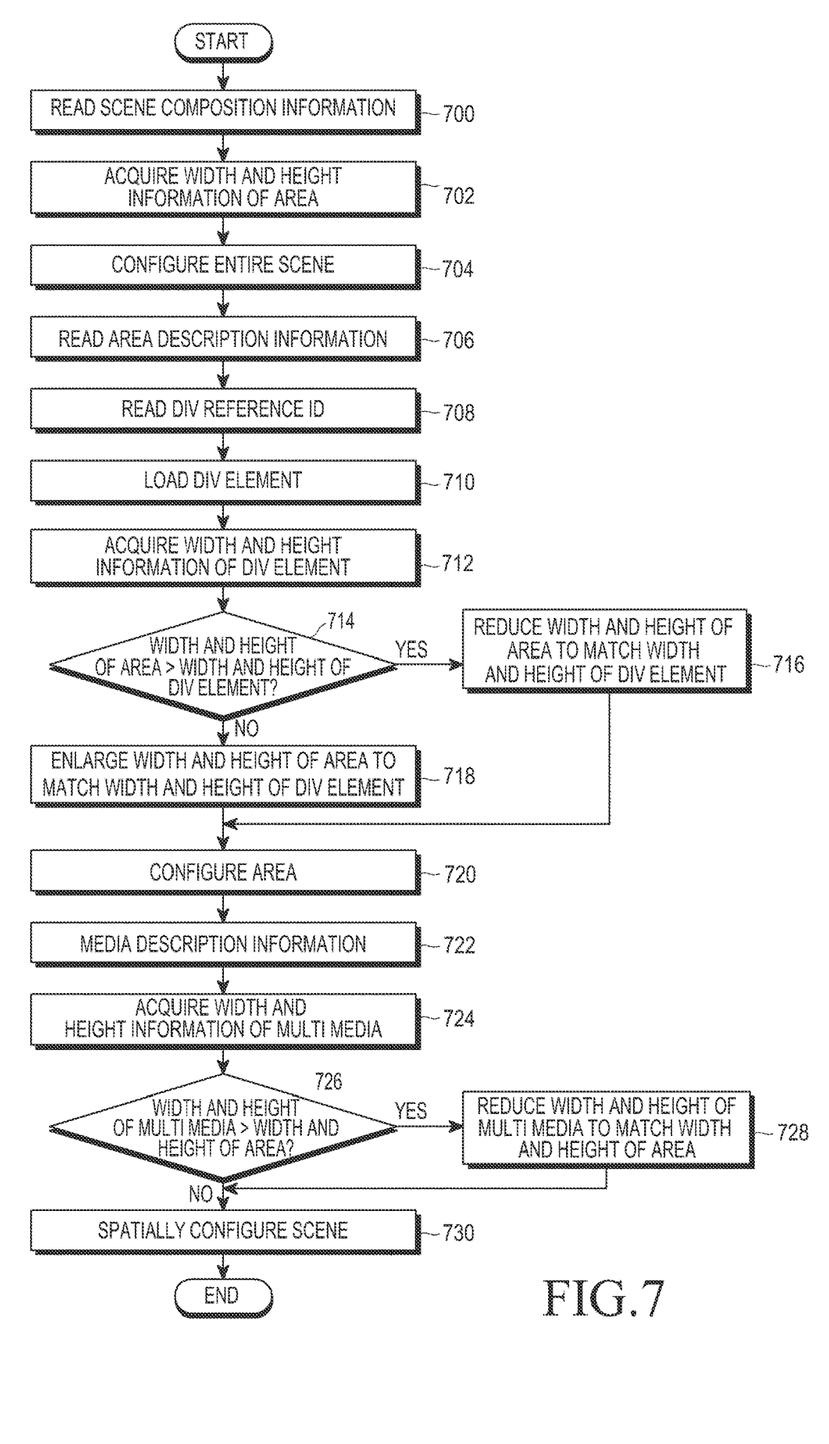
FIG. 7 is a flowchart illustrating a process in which a display device spatially configures a scene based on a markup configured in the multimedia communication system according to an embodiment of the present disclosure.

FIG. 7 is a flowchart illustrating a process in which a display device spatially configures a scene based on a markup configured in the multimedia communication system according to an embodiment of the present disclosure.

Referring to FIG. 7, the display device reads scene composition information of the markup at operation 700 and acquires width and height information of areas included in the scene at operation 702. When the scene composition information is implemented as a separate document, the width and height information of the area are acquired from the separate document. At operation 704, the display device configures entire scenes including areas configured according to the width and height information acquired at operation 702.

The display device reads area description information of the markup at operation 706 and reads a division (hereinafter, referred to as "div") reference identifier at operation 708. The display device loads a div element at operation 710 and acquires width and height information of the div element at operation 712.

At operation 714, the display device determines whether the width and height of the area acquired at operation 702 are larger than or equal to the width and height of the div element. When the width and height of the area are larger than or equal to the width and height of the div element as a result of the determination, the display device reduces the width and height of the area to match the width and height of the div element at operation 716 and proceeds to operation 720.

However, when the width and height of the area are smaller than the width and height of the div element as a result of the determination, the display device enlarges the width and height of the area to match the width and height of the div element at operation 718 and proceeds to operation 720. The display device configures the area according to the reduced or enlarged width and height of the div element at operation 720 and proceeds to operation 722.

The display device reads multimedia description information at operation 722 and acquires width and height information of the multimedia at operation 724. At operation 726, the display device determines whether the width and height of the multimedia acquired at operation 724 are larger than or equal to the width and height of the area configured at operation 720. When the width and height of the multimedia are larger than or equal to the width and height of the area as a result of the determination, the display device reduces the width and height of the multimedia to match the width and height of the area at operation 728.

However, when the width and height of the multimedia are smaller than the width and height of the area as a result of the determination, the display device completes the scene composition through the spatial description of the scene at operation 730.

Figure 8A:
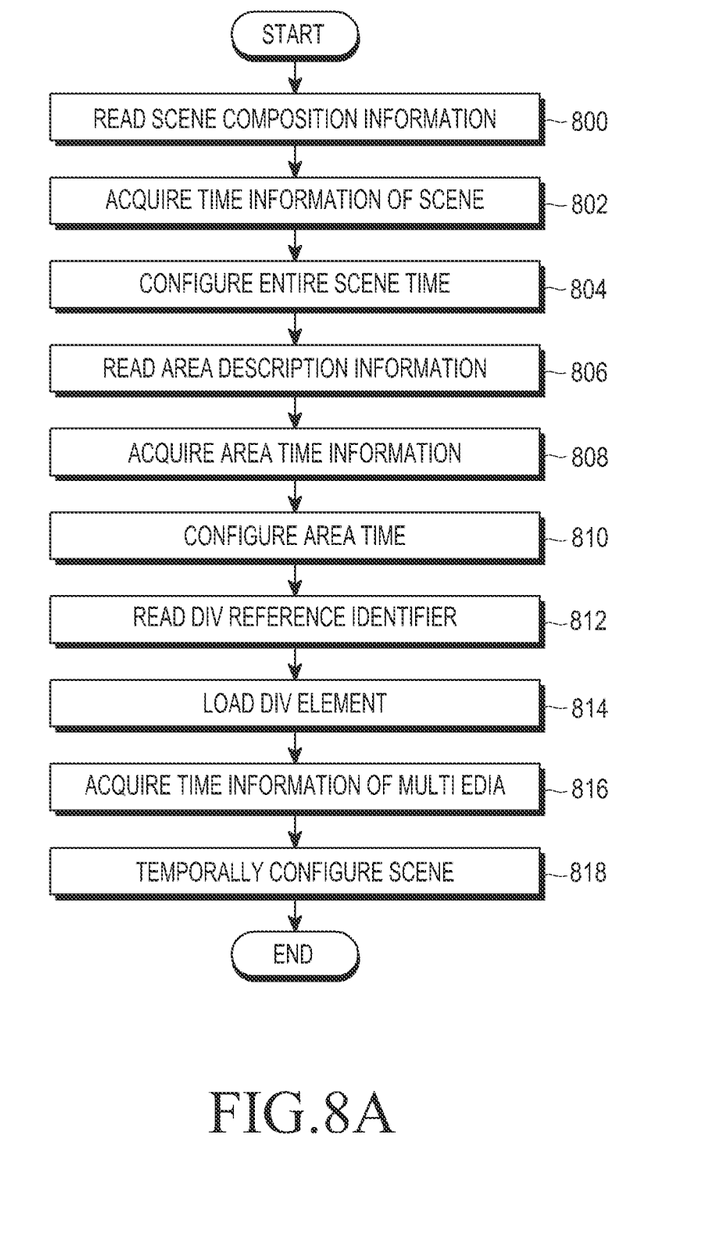
FIG. 8A is a flowchart illustrating a process in which a display device temporally configures a scene based on the markup configured in the multimedia communication system according to the first embodiment of the present disclosure.

FIG. 8A is a flowchart illustrating a process in which a display device temporally configures a scene based on the markup configured in the multimedia communication system according to the first embodiment of the present disclosure. In FIG. 8A, the markup configured according to the first embodiment refers to the markup configured according to the method of FIG. 4A.

Referring to FIG. 8A, the display device reads scene composition information of the markup at operation 800 and acquires time information of the scene at operation 802. At operation 804, the display device temporally configures the entire scene according to the time information of the scene acquired at operation 802.

The display device reads area description information of the markup at operation 806 and acquires time information of each area included in the entire scene at operation 808. The display device temporally configures each area according to the time information of each area acquired at operation 808 at operation 810 and reads a div reference identifier at operation 812.

The display device loads the div element at operation 814 and acquires time information of each multimedia at operation 816. At operation 818, the display device temporally configures each multimedia according to the time information of each multimedia acquired at operation 816 to complete the scene composition.

Figure 8B:
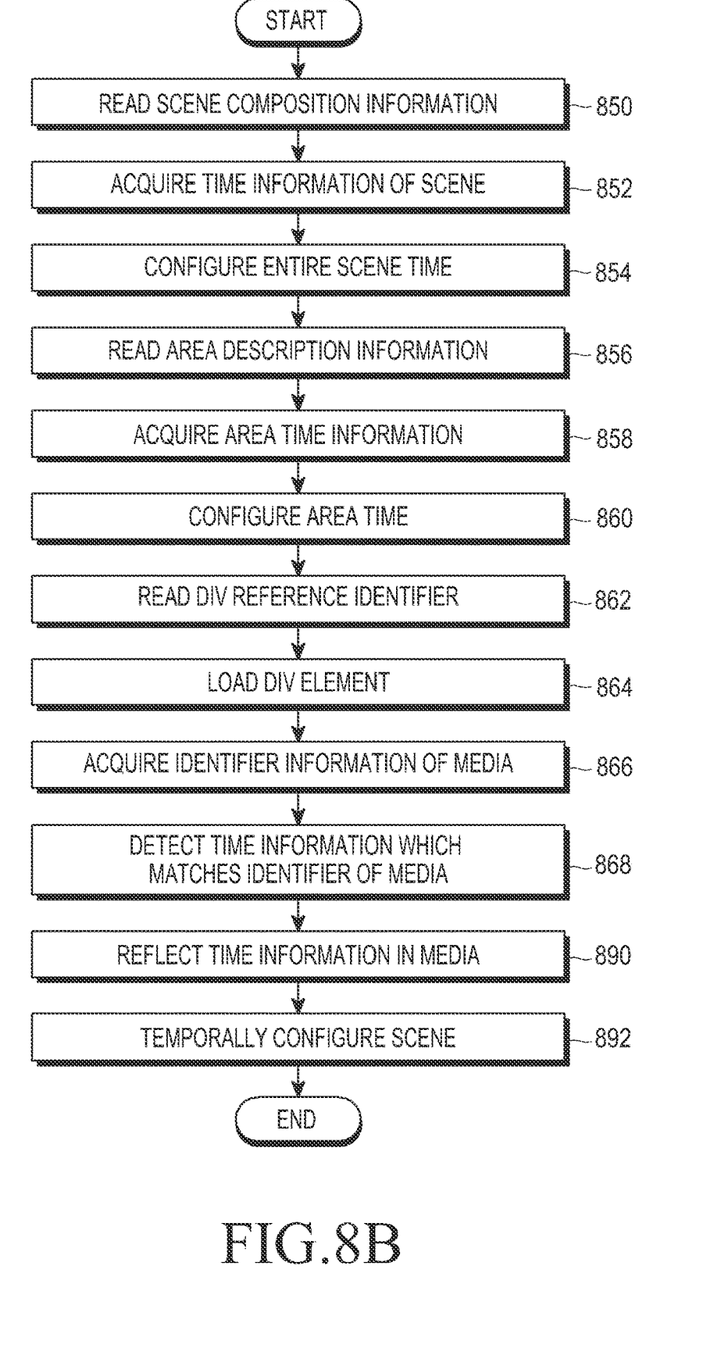
FIG. 8B is a flowchart illustrating a process in which a display device temporally configures a scene based on the markup configured in the multimedia communication system according to the second embodiment of the present disclosure.

FIG. 8B is a flowchart illustrating a process in which a display device temporally configures a scene based on the markup configured in the multimedia communication system according to the second embodiment of the present disclosure. In FIG. 8B, the markup configured according to the second embodiment refers to the markup configured according to the method of FIG. 4B.

Referring to FIG. 8B, the display device reads scene composition information of the markup at operation 850 and acquires time information of the scene at operation 852. At operation 854, the display device temporally configures the entire scene according to the time information of the scene acquired at operation 852.

The display device reads area description information of the markup at operation 856 and acquires time information of each area included in the entire scene at operation 858. The display device temporally configures, at operation 860, each area according to the time information of each area acquired at operation 858 and reads a div reference identifier at operation 862.

The display device loads the div element at operation 864 and acquires identifier information of the multimedia at operation 866. The display device reads time information of the multimedia from the time information of the multimedia of the separately provided markup document and detects time information which matches the identifier of the multimedia at operation 868. At operation 890, the display device acquires the same information as the time information of the multimedia acquired at operation 816 by reflecting the detected time information in the multimedia. Thereafter, the display device temporally configures each multimedia at operation 892 to complete the scene composition.

As described above, operations 850 to 864 are substantially the same as operations 800 to 814 of the first embodiment, and only operations 866 to 890 are different from operation 816 of the first embodiment.

Figure 9:
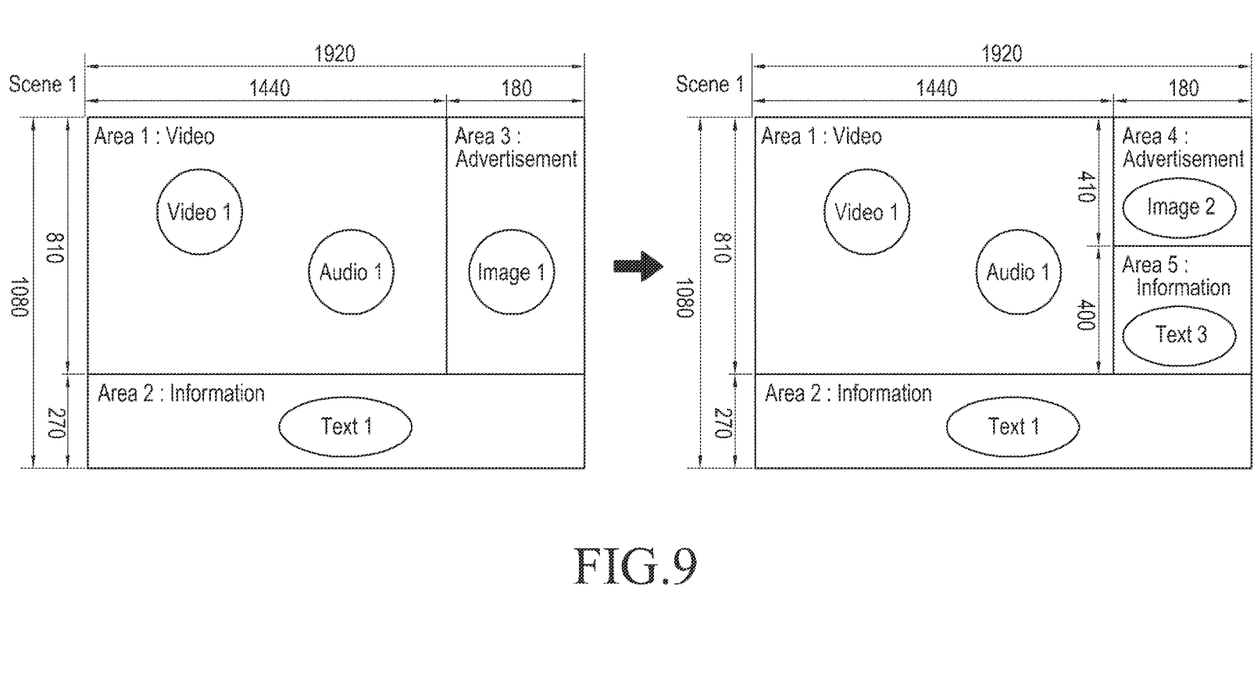
FIG. 9 illustrates an example of configuring a scene according to a markup configured in a multimedia communication system according to an embodiment of the present disclosure.

FIG. 9 illustrates an example of configuring a scene according to a markup configured in a multimedia communication system according to an embodiment of the present disclosure. In FIG. 9, it is assumed that the scene consists of three areas and area 3 is reproduced for 100 seconds and then divided into area 4 and area 5. Further, it is assumed that area 4 is immediately reproduced and area 5 is reproduced after 0.2 seconds when the reproduction of area 3 is completed.

Referring to FIG. 9, scene 1 consists of area 1, area 2, and area 3, where area 1 reproduces a video and audio, area 2 reproduces information in text form, and area 3 reproduces an advertisement image. After the advertisement image of area 3 is reproduced for 100 seconds, the scene is switched and thus area 4 reproduces the advertisement image and area 5 reproduces information in the text form after 0.2 seconds.

An example code of the markup for configuring the scene of FIG. 9 may be shown in Table 6.

TABLE 6

```
<html>
<head>
// Scene information
<mmt-decomposition>
<area id="Area1_s" left="0" top="0" begin="0" />
<area id="Area2_s" left="0" top="810" begin="0" />
<area id="Area3_s" left="1440" top="0" begin="0" dur="100s"/>
<area id="Area4_s" left="1440" top="0" beginAfter="area3" />
<area id="Area5_s" left="1440" top="410" beginAfter="area3" />
<mmt-decomposition>
// Scene description
<body style="position: absolute; width: 1920px; height:1080px; background: #ffff00">
// Area description
    <div id="area1" style="position: absolute; left: 0px; top: 0px; width: 1440px; height: 810px;
    background: #ff0000; border: 1px solid #eee" mmt-ciref_spacial="area1_s"
    mmt-ciref_temporal="area1_t" width="1440" height="810" begin="0">
// Asset description
        <par>
            <video id="video1" scr="video1.mp4">
            <video id="video2" scr="video2.mp4">
        </par>
    </div>
<div id="area2" style="position: absolute; left: 0px; top: 810px; width: 1920px; height: 270px;
background: #00ff00; border: 1px solid #eee" mmt-ciref_spacial="area2_s"
mmt-ciref_temporal="area2_t" width="1920" height="270" begin="0">>
        <par>
```

TABLE 6-continued

```
        <p>Text information</p>
    </par>
</div>
<div id="area3" style="position: absolute; left: 1440px; top: 0px; width: 480px; height: 810px;
background: #0000ff; border: 1px solid #eee" mmt-ciref_spacial="area3_s"
mmt-ciref_temporal="area3_t" width="480" height="810" begin="0">
    <par>
        <img id="Ad" src="image.png">
    </par>
</div>
<div id="area4" style="position: absolute; left: 1440px; top: 0px; width: 480px; height: 410px;
background: #0000ff; border: 1px solid #eee" left="1440" top="0" mmt-
ciref_spacial="area4_s" mmt-ciref_temporal="area4_t" >
    <par>
        <img id="Ad" src="image2.png">
    </par>
</div>
<div id="area5" style="position: absolute; left: 1440px; top: 410px; width: 480px; height: 400px;
background: #0000ff; border: 1px solid #eee" mmt-
ciref_spacial="area5_s" mmt-ciref_temporal="area5_t" width="480" height="400">
    <par>
        <p>This is Text Area</p>
    </par>
</div>
</body>
</html>
```

Figure 10:
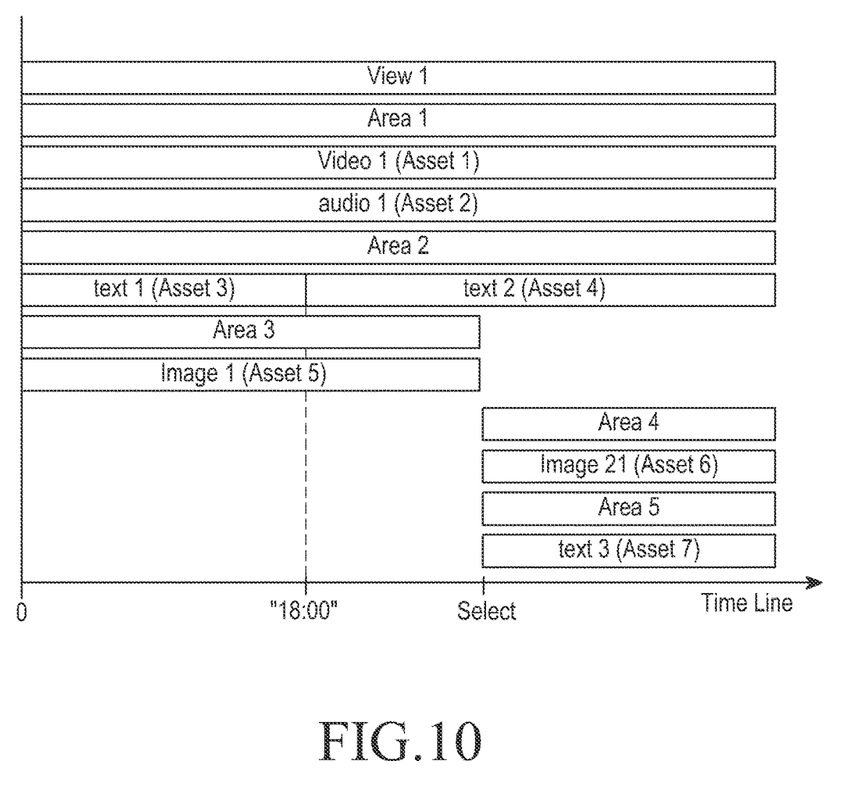
FIG. 10 illustrates time configuration information of an example of scene composition, such as the scene composition illustrated in FIG. 9, according to an embodiment of the present disclosure.

FIG. 10 illustrates time configuration information of an example of scene composition, such as the scene composition illustrated in FIG. 9, according to an embodiment of the present disclosure.

Referring to FIG. 10, a horizontal axis refers to a time axis, area 1 and area 2 are reproduced in entire time area, area 3 is reproduced until a selected time, and area 4 and area 5 are simultaneously reproduced after the selected time.

Figure 11:
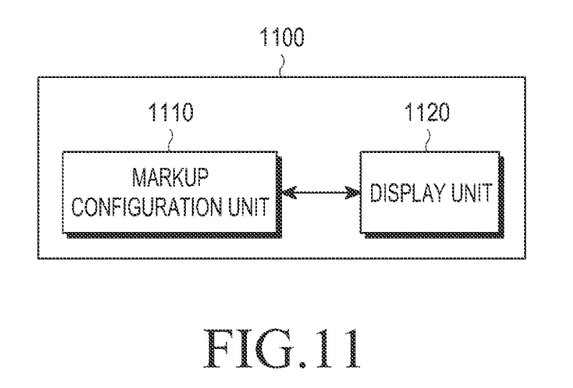
FIG. 11 illustrates a display device spatially and temporally configuring a scene based on a markup configured in the multimedia communication system according to an embodiment of the present disclosure.

FIG. 11 illustrates a display device spatially and temporally configuring a scene based on a markup configured in the multimedia communication system according to an embodiment of the present disclosure.

Referring to FIG. 11, a display device 1100 includes a markup configuration unit 1110 and a display unit 1120.

The markup configuration unit 1110 configures area description information corresponding to each of a plurality of areas included in the scene, configures multimedia description information corresponding to at least one multimedia included in each of the plurality of areas, and configures scene composition information describing spatial composition and temporal composition of each of the plurality of areas. Then, the markup configuration unit configures a markup including the scene composition information, the area description information, and the multimedia description information.

The display unit 1120 acquires width and height information of each of the plurality of areas from the scene composition information, acquires width and height information of a multimedia element from the area description information, and configures an area by considering the width and height information of the area and the width and height information of the multimedia element. Then, the display unit 1120 acquires the width and height information of the multimedia from the multimedia description information and configures the scene by considering the width and height information of the area and the width and height information of the multimedia.

It may be appreciated that a method of configuring a markup for spatially and temporally composing and synchronizing multimedia components according to embodiments of the present disclosure can be implemented in software, hardware, or a combination thereof. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be also appreciated that the memory included in the mobile terminal is one example of machine-readable devices suitable for storing a program including instructions that are executed by a processor device to thereby implement embodiments of the present disclosure. Therefore, embodiments of the present disclosure provide a program including codes for implementing a system or method claimed in any claim of the accompanying claims and a machine-readable device for storing such a program. Further, this program may be electronically conveyed through any medium such as a communication signal transferred via a wired or wireless connection, and embodiments of the present disclosure appropriately include equivalents thereto.

Accordingly, the present disclosure includes a program including a code for implementing an apparatus and a method stated in the claims of the specification and a machine (computer)-readable storage medium storing the program. Further, the program may be electronically transported through a random medium such as a communication signal transmitted through a wired or wireless connection and the present disclosure properly includes the equivalents thereof.

Further, a device for configuring a markup for spatially and temporally composing and synchronizing multimedia components according to an embodiment of the present disclosure can receive the program from a program providing apparatus connected to the device wirelessly or through a wire and store the received program. The program providing apparatus may include a memory for storing a program containing instructions for allowing the device to perform a preset content protecting method and information required for the content protecting method, a communication unit for performing wired or wireless communication with the device, and a controller for transmitting the corresponding program to the device according to a request of the device or automatically.

While the present disclosure has been shown and described with reference to various embodiments thereof, it will be understood by those skilled in the art that various changes in form and details may be made therein without departing from the spirit and scope of the present disclosure as defined by the appended claims and their equivalents thereof.

What is claimed is:

1. A method of displaying a scene in a multimedia system, the method comprising:
   receiving, by a display device, a markup file from a server supporting a multimedia service, wherein the markup file comprises scene composition information related to spatial composition and temporal composition of each of a plurality of areas in the scene and scene description information related to displaying at least one multimedia on each of the plurality of areas;
   acquiring width and height information of each of the plurality of areas from the scene composition information and acquiring width and height information of a div element from the area description information;
   configuring the plurality of areas based on the width and height information of the areas and the width and height information of the div element;
   composing, by the display device, the scene so that the plurality of areas are arranged in the scene based on the scene composition information;
   obtaining, by the display device, area description information and multimedia description information corresponding to each of the plurality of areas from the scene description information; and
   displaying, by the display device, the at least one multimedia on each of the plurality of areas arranged in the composed scene based on the area description information and the multimedia description information,
   wherein the area description information comprises the multimedia description information.

2. The method of claim 1, wherein the composing of the scene further comprises:
   acquiring width and height information of multimedia from the multimedia description information; and
   configuring the scene based on width and height information of the configured area and the width and height information of the multimedia.

3. The method of claim 2, wherein the configuring of the area further comprises:
   comparing a width and a height of the area with a width and a height of the div element;
   reducing the width and the height of the area to match the width and the height of the div element when the width and the height of the area are larger than the width and the height of the div element; and
   enlarging the width and the height of the area to match the width and the height of the div element when the width and the height of the area are smaller than the width and the height of the div element.

4. The method of claim 3, wherein the composing of the scene further comprises:
   comparing the width and the height of the configured area with a width and a height of the multimedia;
   reducing the width and the height of the multimedia to match the width and the height of the configured area when the width and the height of the multimedia are larger than the width and the height of the configured area; and
   maintaining the width and the height of the multimedia when the width and the height of the multimedia are smaller than the width and the height of the configured area.

5. The method of claim 2, wherein the area description information includes at least one attribute of a width of the div element, a height of the div element, a start time of the div element, an end time of the div element, or a duration time of the div element.

6. The method of claim 1, wherein the composing of the scene further comprises:
   acquiring time information of the scene from the scene composition information and composing the scene related to the time information of the scene;
   acquiring time information of each area from the area description information and composing each area related to the time information of each area; and
   acquiring multimedia time information from the multimedia description information and composing the multimedia related to the multimedia time information.

7. The method of claim 6, wherein, when the scene composition information is configured separately from the area description information and the multimedia description information, the composing of the multimedia based on the multimedia time information further comprises:
   detecting time information which matches for an identifier of the multimedia from the scene composition information, and
   temporally composing the multimedia based on the detected time information.

8. The method of claim 1, wherein the scene composition information includes at least one attribute of an x axis offset, a y axis offset, a width of the area, a height of the area, a start time of the area, an end time of the area, or a duration time of the area.

9. A non-transitory computer-readable storage medium storing instructions that, when executed, cause at least one processor to perform the method of claim 1.

10. The method of claim 1, further comprising:
    acquiring a first size information of each of the plurality of areas from the scene composition information;
    acquiring a second size information of an element from the area description information;
    configuring an area based on the first size information and the second size information; and
    adjusting size of the area when the first size information is different from the second size information.

11. The method of claim 10, further comprising:
    acquiring a third size information of multimedia from the multimedia description information;
    configuring the scene based on the adjusted size of the area and the third size information of the multimedia; and
    adjusting size of the multimedia when the size of the multimedia is bigger than the adjusted size of the area.

12. A device for displaying a scene in a multimedia system, the device comprising:
    a control unit implemented in at least one processor configured to:
      receive a markup file from a server supporting a multimedia service, wherein the markup file comprises scene composition information related to spatial composition and temporal composition of each of a plurality of areas in the scene and scene description information related to displaying at least one multimedia on each of the plurality of areas, acquire width and height information of each of the plurality of areas from the scene composition information and acquiring width and height information of a div element from the area description information, configure the plurality of areas based on the width and height information of the areas and the width and height information of the div element, compose the scene so that the plurality of areas are arranged in the scene based on the scene composition information, and obtain area description information and multimedia description information corresponding to each of the plurality of areas from the scene description information; and a display configured to display the at least one multimedia on each of the plurality of areas arranged in the composed scene, based on the area description information and the multimedia description information, wherein the area description information comprises the multimedia description information.

13. The device of claim 12, wherein the control unit is further configured to:

acquire width and height information of multimedia from the multimedia description information, and configure the scene based on width and height information of the configured area and the width and height information of the multimedia.

14. The device of claim 13, wherein the control unit is further configured to:

compare a width and a height of the area with a width and a height of the div element, reduce the width and the height of the area to match the width and the height of the div element when the width and the height of the area are larger than the width and the height of the div element, and enlarge the width and the height of the area to match the width and the height of the div element when the width and the height of the area are smaller than the width and the height of the div element.

15. The device of claim 14, wherein the control unit is further configured to:

compare a width and a height of the configured area with a width and a height of the multimedia, reduce the width and the height of the multimedia to match the width and the height of the configured area when the width and the height of the multimedia are larger than the width and the height of the configured area, and maintain the width and the height of the multimedia when the width and the height of the multimedia are smaller than the width and the height of the configured area.

16. The device of claim 12, wherein the control unit is further configured to:

acquire time information of the scene from the scene composition information, compose the scene related to the time information of the scene, acquire time information of each area from the area description information, compose each area related to the time information of each area, acquire multimedia time information from the multimedia description information, and compose the multimedia related to the multimedia time information.

17. The device of claim 16, wherein, when the scene composition information is configured separately from the area description information and the multimedia description information, the control unit is further configured to:

detect time information which matches for an identifier of the multimedia from the scene composition information, and temporally compose the multimedia based on the detected time information in the multimedia.

18. The device of claim 12, wherein the scene composition information includes at least one attribute of an x axis offset, a y axis offset, a width of the area, a height of the area, a start time of the area, an end time of the area, or a duration time of the area.

19. The device of claim 13, wherein the area description information includes at least one attribute of a width of the div element, a height of the div element, a start time of the div element, an end time of the div element, or a duration time of the div element.

20. The device of claim 12, wherein the control unit is further configured to:

acquire a first size information of each of the plurality of areas from the scene composition information;

acquire a second size information of an element from the area description information;

configure an area based on the first size information and the second size information; and adjust size of the area when the first size information is different from the second size information.

21. The device of claim 20, wherein the control unit is further configured to:

acquire a third size information of multimedia from the multimedia description information;

configure the scene based on the adjusted size of the area and the third size information of the multimedia; and adjust size of the multimedia when the size of the multimedia is bigger than the adjusted size of the area.

* * * * *